(No Model.)

A. REESE.
NUT LOCK.

No. 287,390. Patented Oct. 23, 1883.

Witnesses.
J. M. Cooke
O. R. Terburgh.

Inventor.
Abram Reese
by James I. Kay
Attorney

UNITED STATES PATENT OFFICE.

ABRAM REESE, OF PITTSBURG, ASSIGNOR OF ONE-FOURTH TO F. G. KAY, OF ALLEGHENY CITY, PENNSYLVANIA.

NUT-LOCK.

SPECIFICATION forming part of Letters Patent No. 287,390, dated October 23, 1883.

Application filed July 24, 1883. (No model.)

*To all whom it may concern:*

Be it known that I, ABRAM REESE, of Pittsburg, in the county of Allegheny and State of Pennsylvania, have invented a new and useful Improvement in Nut-Locks; and I do hereby declare the following to be a full, clear, and exact description thereof.

My invention relates to devices for holding nuts in place and preventing their being unscrewed by the jarring or vibration of the rails, bars, or other parts of machinery united by them, or by the frequent changes of load or strain to which they are subjected.

One of the most efficient devices for locking-nuts heretofore found has been what is termed "jam-nuts," in which, after the nut was screwed tight to place, a second nut was screwed upon the bolt and turned tight against the first nut, so that they jammed against each other, and also forced the threads of the nuts tight against the threads of the bolts, thus giving so tight a hold as to prevent either nut from unscrewing. Where, however, it was necessary that provision be made in the joint to allow the parts connected to expand and contract, or to spread upon receiving a heavy load or upon other strains, as is the case with rail-joints and other connections, these jam-nuts do not answer the purpose properly, because they do not permit the expansion or spreading of the parts, and either hold the parts too rigidly or else the strain is sufficient to cause the stripping of the threads of the nuts or bolt. The use of the jam-nuts was also expensive, as it required double the number of nuts usually employed. The object of my invention is to provide a simple locking or jamming device, which will embody all the advantageous features of the jam-nut, and yet allow for the springing, spreading, expansion, or contraction of the parts connected, and one which can be made as cheaply as any nut-locking device in the market.

It consists, essentially, in a concavo-convex plate-metal washer, having a threaded hole therein, and adapted to be screwed upon the bolt before the securing-nut and jam between the nut and parts connected, and at the same time form a spring between them, allowing for any spreading or expansion of the parts and taking up any contraction thereof.

To enable others skilled in the art to make and use my invention, I will describe it more fully, referring to the accompanying drawings, in which—

Figure 1:
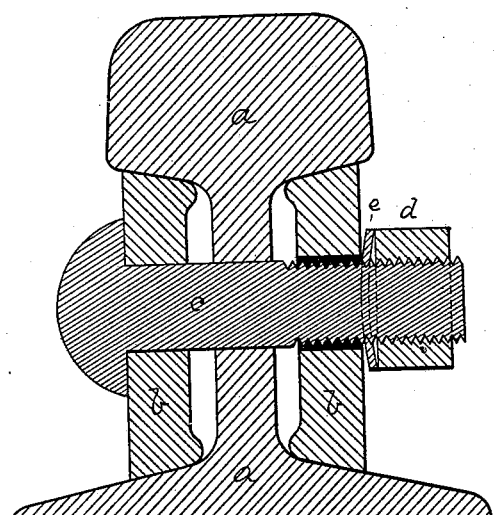
Figure 2:
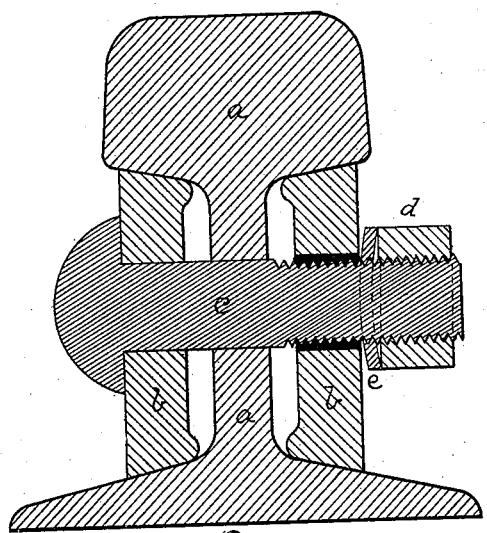
Figure 3:
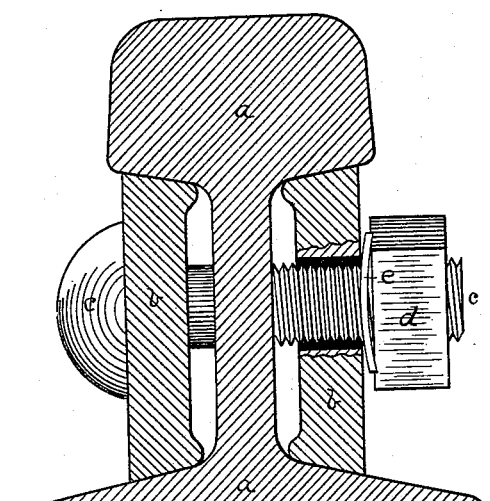
Figure 4:
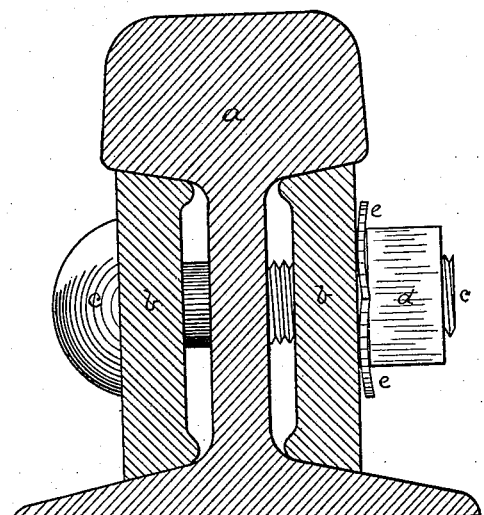
Figure 5:
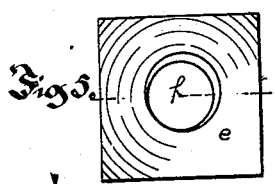
Figure 7:
Figure 6:
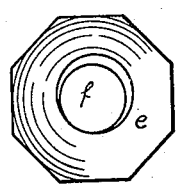

Figures 1 and 2 are cross-sections of a rail-joint through the bolt, showing washers of different thickness. Figs. 3 and 4 are cross-sections in front of the bolt, showing the washers in different positions. Figs. 5 and 6 are face views of the washers, and Fig. 7 is an enlarged cross-section thereof.

Like letters of reference indicate like parts in each.

The rail $a$ and fish-plates $b$ may be of any desired construction, and illustrate any parts desired to be connected by bolts and nuts. The bolt $c$ is an ordinary threaded bolt, and is held from turning by an oblong enlargement near the head, fitting into a like hole in the fish-plate, or by other suitable means. The nut $d$ is the ordinary square, hexagonal, or other angular nut adapted to screw on the bolt. The washer $e$ is made of plate metal, preferably steel, and is dished or concavo-convex in cross-section. It is preferably of the same outward shape as the nut employed, and has the threaded hole $f$ in the center thereof corresponding in thread to the bolt over which it is to be screwed. Only one thread is required in the washer, though in Fig. 2 a thicker washer, having two threads, has been shown. These washers can be rapidly and cheaply formed, being cut from the plate, punched, and given the necessary dish or concavo-convex form at one operation, and then a quantity placed in a box or on a rod and fed to a suitable tapping-machine, by which they can be rapidly threaded, the only extra cost over the ordinary washer being the threading. They are preferably made of steel, as when angular in shape their edges will then cut or bite into the nut, as well as hold thereto by the friction of the surfaces when jammed.

When a lock is to be made, the bolt is passed through the rail and fish-plates or other parts to be connected, and the washer is then screwed onto the bolt, the concave face being preferably next to the nut. The nut is then screwed on, and, if desired, both washer and nut may be caught by the wrench and screwed up together until the washer binds against the fish-plate. The nut is then turned until it jams firmly with the dished washer, and the lock is made. As the faces of the nut and washer jam against each other, and the threads of the nut and washer are also forced tight against the threads of the bolt, a secure lock is obtained, which prevents either from turning or unscrewing upon the jarring or vibration of the parts connecting or the frequent changes of the load or strain thereon. The lock is also increased where an angular washer is employed, and the nut is turned at an angle to the washer, as shown in Figs. 2 and 3, as the edges of the washer will cut into the nut and hold it. In case of the spreading or expansion of the parts, as the bearing of the fish-plate upon the washer is above or outside of the threads, the hole in the fish-plate being larger than the bolt, the washer will yield, and so prevent the stripping of the threads of the nut or bolt, and where the parts contract, as in cold weather, the washer will take up the space left and hold the joint tight.

What I claim as my invention, and desire to secure by Letters Patent, is—

1. In nut-locking devices, a threaded concavo-convex plate-metal spring-washer, substantially as described.

2. In nut-locking devices, the combination, with a nut and threaded bolt, of a threaded concavo-convex plate-metal spring-washer, substantially for the purpose set forth.

3. In nut-locking devices, the combination, with a nut and threaded bolt, of a threaded concavo-convex plate-metal spring-washer of angular shape and of greater size from corner to corner than the size of the nut from side to side, substantially as and for the purposes set forth.

In testimony whereof I, the said ABRAM REESE, have hereunto set my hand.

ABRAM REESE.

Witnesses:
JAMES I. KAY,
J. N. COOKE.